US012195094B2

(12) United States Patent
Kim et al.

(10) Patent No.: US 12,195,094 B2
(45) Date of Patent: Jan. 14, 2025

(54) BODY OF VEHICLE (71) Applicants: Hyundai Motor Company, Seoul (KR); Kia Corporation, Seoul (KR)

(72) Inventors: Do Hoi Kim, Sejong-si (KR); Jung Jong Chun, Seoul (KR); Hee Dae Oh, Suwon-si (KR); Frank Petetin, Mainz (DE); Bahman Moarefi, Mainz (DE)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 263 days.

(21) Appl. No.: 17/880,094

(22) Filed: Aug. 3, 2022

(65) Prior Publication Data
US 2023/0068984 A1    Mar. 2, 2023

(30) Foreign Application Priority Data
Aug. 26, 2021    (KR) .......................... 10-2021-0113501

(51) Int. Cl.
*B62D 27/02* (2006.01)
*B62D 25/02* (2006.01)
*B62D 25/04* (2006.01)

(52) U.S. Cl.
CPC ........... *B62D 27/023* (2013.01); *B62D 25/04* (2013.01); *B62D 25/025* (2013.01)

(58) Field of Classification Search
CPC ...... B62D 25/02; B62D 25/025; B62D 25/04; B62D 25/2036; B62D 25/06; B62D 27/023
USPC ............. 296/187.12, 193.06, 193.05, 203.03
See application file for complete search history.

(56) References Cited

U.S. PATENT DOCUMENTS

| 5,228,259 | A  | * | 7/1993  | Haddad   | B62D 33/044 52/653.2   |
| 6,217,109 | B1 | * | 4/2001  | Okana    | B62D 25/025 296/203.03 |
| 6,279,990 | B1 | * | 8/2001  | Miyasaka | B62D 25/04 296/193.06  |
| 7,001,097 | B2 | * | 2/2006  | Wang     | F16B 9/09 403/231      |
| 8,038,205 | B2 | * | 10/2011 | Hedderly | B62D 65/04 296/203.03  |
| 8,177,277 | B2 | * | 5/2012  | Hedderly | B62D 23/00 296/203.03  |
| 8,272,682 | B2 |   | 9/2012  | Cimatti  |                        |

(Continued)

FOREIGN PATENT DOCUMENTS

JP    2001106118 A    4/2001
JP    2004338419 A    12/2004
(Continued)

*Primary Examiner* — Gregory A Blankenship
(74) *Attorney, Agent, or Firm* — Slater Matsil, LLP (57) ABSTRACT An embodiment vehicle body includes a pillar member including an upper fastening portion at an upper end and a lower fastening portion at a lower end, a roof side coupling portion provided in a roof member extending in a longitudinal direction of the vehicle body, wherein the roof side coupling portion is configured to be coupled to the upper fastening portion by insertion coupling, and a side sill side coupling portion provided in a side sill member extending in the longitudinal direction of the vehicle body, wherein the side sill side coupling portion is configured to be coupled to the lower fastening portion by insertion coupling.

20 Claims, 8 Drawing Sheets

(56) References Cited

U.S. PATENT DOCUMENTS

| | | | |
|---|---|---|---|
| 9,102,357 B2 * | 8/2015 | Watanabe | B62D 27/00 |
| 9,308,941 B2 * | 4/2016 | Kanaguchi | B62D 25/04 |
| 10,144,455 B2 | 12/2018 | Anegawa et al. | |
| 11,679,816 B2 * | 6/2023 | Fuentes | B62D 25/04 |
| | | | 296/187.12 |
| 2003/0141747 A1 * | 7/2003 | Honma | B62D 25/06 |
| | | | 296/203.03 |
| 2006/0055209 A1 * | 3/2006 | Hoshino | B62D 25/04 |
| | | | 296/203.03 |
| 2010/0052367 A1 * | 3/2010 | Miyashita | B62D 25/04 |
| | | | 296/203.03 |
| 2010/0244497 A1 * | 9/2010 | Honda | B62D 23/005 |
| | | | 296/205 |
| 2012/0205029 A1 * | 8/2012 | Riley | B62D 29/002 |
| | | | 156/79 |
| 2013/0187406 A1 * | 7/2013 | Torii | B62D 25/025 |
| | | | 296/187.12 |
| 2013/0270864 A1 * | 10/2013 | Young | B60K 1/04 |
| | | | 296/187.12 |
| 2014/0346816 A1 * | 11/2014 | Craig | B62D 27/023 |
| | | | 296/203.03 |
| 2016/0046328 A1 * | 2/2016 | Steffens | B62D 29/008 |
| | | | 296/193.06 |
| 2016/0152274 A1 | 6/2016 | Kang et al. | |
| 2016/0236719 A1 * | 8/2016 | Tanaka | B62D 21/157 |
| 2017/0259854 A1 * | 9/2017 | Sausaman | B62D 65/024 |
| 2019/0176723 A1 * | 6/2019 | Yamashita | B60R 16/0215 |
| 2020/0164926 A1 * | 5/2020 | Cha | B62D 27/023 |
| 2020/0307707 A1 * | 10/2020 | Makuch | B62D 29/002 |
| 2021/0171101 A1 * | 6/2021 | Kim | B62D 27/023 |
| 2021/0171124 A1 * | 6/2021 | Kim | B62D 25/025 |
| 2021/0179182 A1 * | 6/2021 | Kim | B62D 25/081 |
| 2021/0179196 A1 * | 6/2021 | Kim | B62D 25/04 |
| 2022/0048575 A1 * | 2/2022 | Kim | B62D 25/06 |
| 2022/0126927 A1 * | 4/2022 | Kim | B62D 25/14 |
| 2022/0332375 A1 * | 10/2022 | Moarefi | B22F 5/10 |
| 2023/0068984 A1 * | 3/2023 | Kim | B62D 27/023 |
| 2023/0139918 A1 * | 5/2023 | Kim | B62D 25/025 |
| | | | 296/193.05 |

FOREIGN PATENT DOCUMENTS

| | | |
|---|---|---|
| JP | 2007290532 A | 11/2007 |
| JP | 2020159422 A | 10/2020 |
| KR | 101620226 B1 | 5/2016 |
| KR | 20210061527 A | 5/2021 |
| KR | 20210061528 A | 5/2021 |

\* cited by examiner

BODY OF VEHICLE

CROSS-REFERENCE TO RELATED APPLICATIONS

This application claims the benefit of Korean Patent Application No. 10-2021-0113501, filed on Aug. 26, 2021, which application is hereby incorporated herein by reference.

TECHNICAL FIELD

The present invention relates to a body of a vehicle.

BACKGROUND

A B-pillar is adopted in a vehicle to reinforce the rigidity of the vehicle. The B-pillar serves to absorb an impact caused by a side collision as the members constituting the B-pillar of the vehicle undergo large deformations in the initial stage of the side collision.

A conventional vehicle body was manufactured through the manufacturing of a vehicle undercarriage first, then coupling of pillar members thereto, and then, coupling of a roof of the vehicle thereto.

However, in recent years, there has been a demand for technology for coupling an upper body of the vehicle into which the front pillar, rear pillar, and roof member are integrally manufactured to the lower body of the vehicle after the lower body of the vehicle is manufactured, and then coupling the pillar member connecting the upper body and the lower body to the upper body and the lower body.

The matters described above as the technical background are intended only for a better understanding of the background of the present disclosure and should not be taken as an acknowledgment that they pertain to the conventional art already known to those skilled in the art.

SUMMARY

The present invention relates to a body of a vehicle. Particular embodiments relate to technology for mounting a pillar member of a vehicle on the vehicle.

Embodiments of the present invention can address the issues in the art, and an embodiment of the present invention provides technology for disposing a coupling portion on a roof side and a side sill side of a vehicle respectively and providing a fastening portion at an upper end portion and a lower end portion of a pillar member respectively so that the fastening portion and the coupling portion are matched to couple the pillar member to a body of the vehicle.

A body of a vehicle according to embodiments of the present invention includes a pillar member provided with an upper fastening portion at an upper end and a lower fastening portion at a lower end, a roof side coupling portion provided in a roof member extending in the longitudinal direction of the vehicle to be coupled to the upper fastening portion by insertion coupling when the pillar member is coupled, and a side sill side coupling portion provided in a side sill member extending in the longitudinal direction of the vehicle to be coupled to the lower coupling portion by insertion coupling when the pillar member is coupled.

The roof side coupling portion may include a first hook portion protruding downward from a side surface of the roof, and the upper fastening portion may include a first insertion groove formed in a shape corresponding to a shape of the first hook portion so that the first hook portion may be inserted.

The first hook portion may include a first protrusion portion protruding downward from the side surface of the roof and a first extension portion with a cross-sectional area expanded from the first protrusion portion, and the upper fastening portion may be formed to surround the first extension portion and the first protrusion portion.

The pillar member may include a first indentation portion formed by an indentation of an inner panel in a part of the pillar member to which the upper fastening portion is coupled.

The roof side coupling portion may include a first coupling portion extending toward the roof so as to be coupled to the roof, and the first coupling portion may be manufactured in various shapes.

The side sill side coupling portion may include a second hook portion protruding upward from the side sill, and the lower fastening portion may include a second insertion groove formed in a shape corresponding to the shape of the second hook portion so that the second hook portion may be inserted.

The second hook portion may include a second protrusion portion protruding upward from the upper surface of the side sill and a second extension portion with a cross-sectional area expanded from the second protrusion portion, and the lower fastening portion may be formed to surround the second extension portion and the second protrusion portion.

A plurality of the second protrusion portions and the second extension portions may be disposed to be spaced apart from each other in the extending direction of the side sill, and a plurality of the lower fastening portions may be provided to match the second protrusion portions and the second extension portions.

The side sill side coupling portion may include a second coupling portion extending in the direction in which the side sill extends so as to be coupled to the side sill.

The pillar member may include a second indentation portion formed by an indentation of the inner panel in a part of the pillar member where the lower fastening portion is coupled.

An adhesive material may be applied to the upper fastening portion or the roof side coupling portion for coupling, and an adhesive material may be applied to the lower fastening portion or the side sill side coupling portion for coupling.

The pillar member may be coupled to the vehicle body by a roof side coupling portion and the side sill side coupling portion, and then, be fixed to the vehicle body by mechanical coupling.

According to embodiments of the present invention, the pillar member is provided with the upper fastening portion at the upper end portion and the lower fastening portion at the lower end portion, the side surface member of the roof is provided with the roof side coupling portion, and the side sill is provided with the side sill side coupling portion so that the upper fastening portion is coupled to the roof side coupling portion and the lower fastening portion is coupled to the side sill coupling portion. This has the effect of easily coupling the pillar member to the body of the vehicle.

In addition, the roof side coupling portion and the side sill side coupling portion are formed in a protruding shape and the upper fastening portion and the lower fastening portion are formed in a groove shape for lateral insertion so that the pillar member is easily coupled to the body of the vehicle by lateral insertion coupling. This has the effect of easy coupling in the vehicle manufacturing line and the effect of coupling at an exact position.

In addition, the pillar member is further coupled by additional coupling such as bolting or riveting after the pillar member is coupled, and this has the effect of double fixing the pillar member.

DETAILED DESCRIPTION OF ILLUSTRATIVE EMBODIMENTS

Specific structural or functional descriptions of the embodiments of the present invention disclosed in the present specification or application are presented by way of examples only for the purpose of describing the embodiments according to the present invention, and the embodiments according to the present invention may be implemented in various forms and should not be construed as being limited to the embodiments described in the present specification or application.

Since the embodiments of the present invention may be modified in various ways and have various forms, specific embodiments will be illustrated in the drawings and described in the present specification or application. However, this is not intended to limit the embodiments according to the concept of the present invention to the specific forms and should be construed as including all modifications, equivalents, and substitutes included in the spirit and technical scope of the present invention.

Terms such as first and/or second may be used to describe various components, but the components should not be limited by the terms. The terms only serve the purpose of distinguishing one component from other components. For example, the first component may be referred to as the second component, and similarly, the second component may also be referred to as the first component without deviating from the scope of the rights according to the concept of the present invention.

When a component is referred to as being "connected" or "coupled" to another component, it may be directly connected or coupled to the another component, but it should be understood that other components may exist in between. On the other hand, when a component is referred to as being "directly connected" or "directly coupled" to another component, it should be understood that there are no intervening components present. Other expressions describing the relationship between components such as "between" and "just between" or "adjacent to" and "directly adjacent to" should be interpreted in the same manner.

The terms used herein are used for the purpose of describing particular embodiments only and are not intended to limit the invention. Singular expressions include plural expressions unless the context explicitly indicates otherwise. In the present specification, terms such as "comprise" or "have" are intended to designate the presence of implemented features, numbers, steps, operations, components, parts, or combinations thereof and should not be understood to preclude the presence of additional possibilities of one or more of other features, numbers, steps, operations, components, parts, or combinations thereof in advance.

Unless otherwise defined, all terms used herein, including technical or scientific terms, have the same meanings as are generally understood by those with common knowledge in the art to which the present invention pertains. It will be further understood that terms, such as those defined in commonly used dictionaries, should be interpreted as having a meaning that is consistent with their meaning in the context of the present specification, and will not be interpreted in an idealized or overly formal sense unless expressly so defined herein.

In the following, embodiments of the present invention will be described in detail by describing preferred embodiments of the present invention with reference to the accompanying drawings. The same reference numerals shown in the respective drawings indicate the same members.

Figure 1:
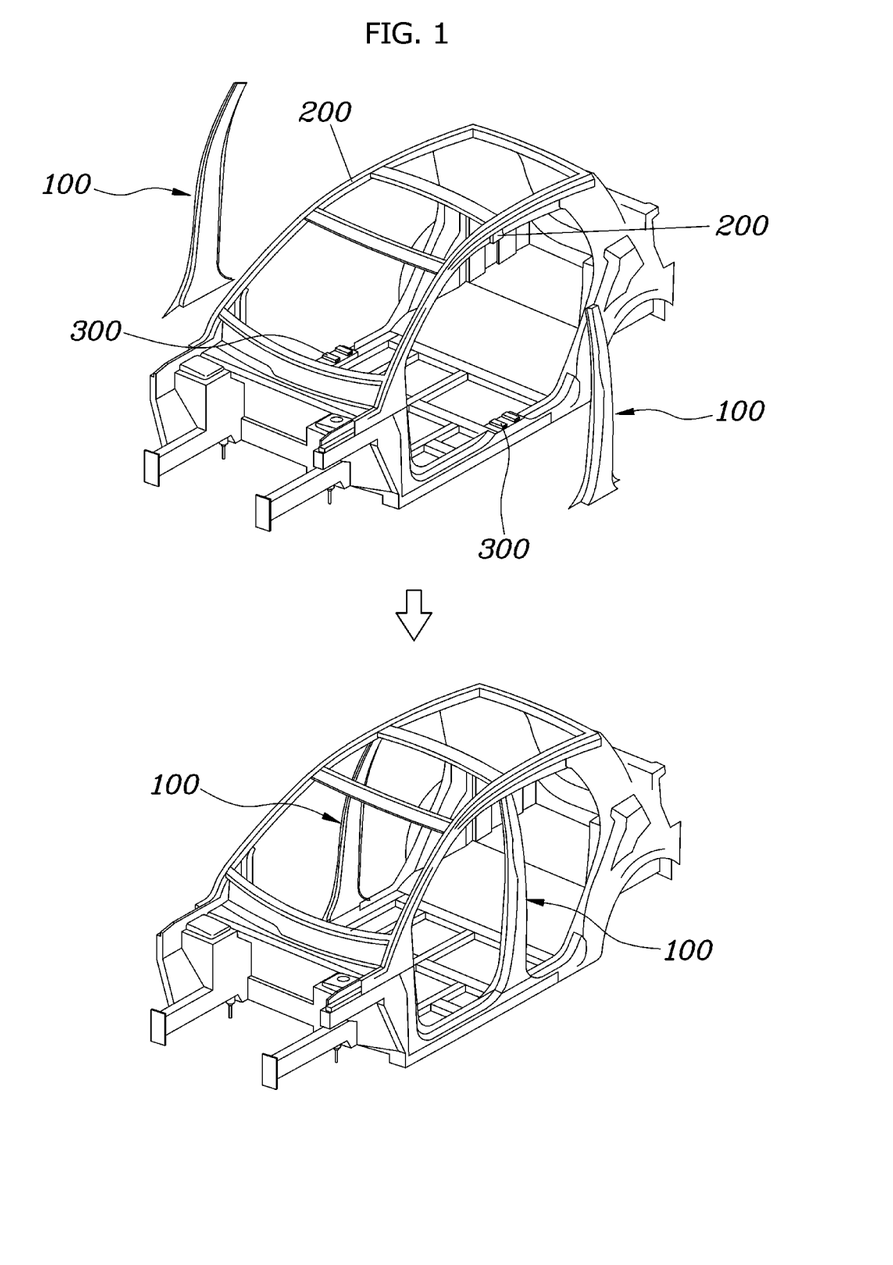
FIG. 1 is a view showing a body of a vehicle being coupled according to an embodiment of the present invention.
Figure 2:
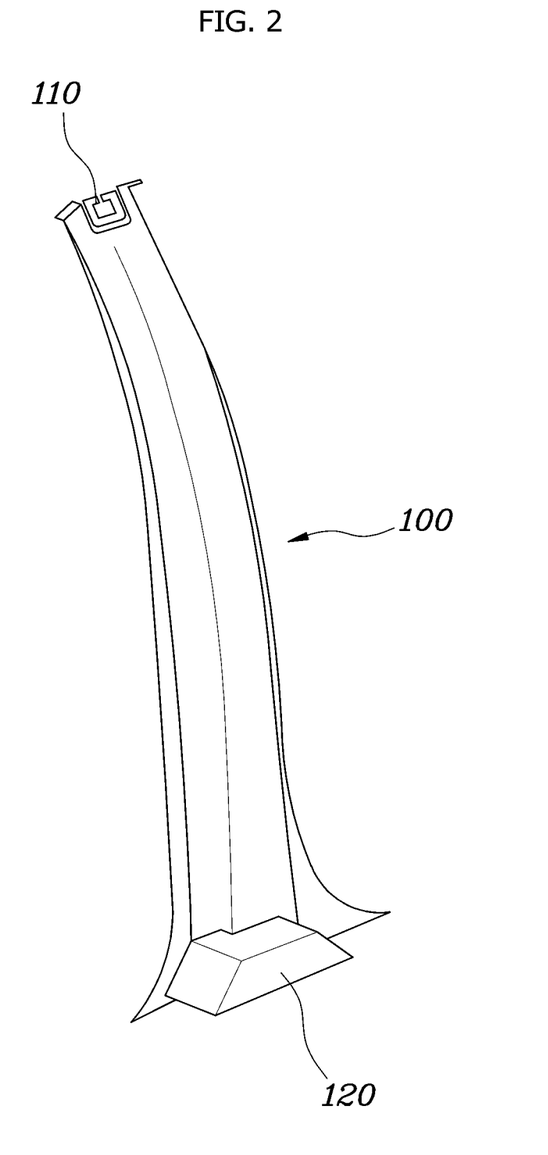
FIG. 2 is a view showing a pillar member of a body of a vehicle according to an embodiment of the present invention.
Figure 3:
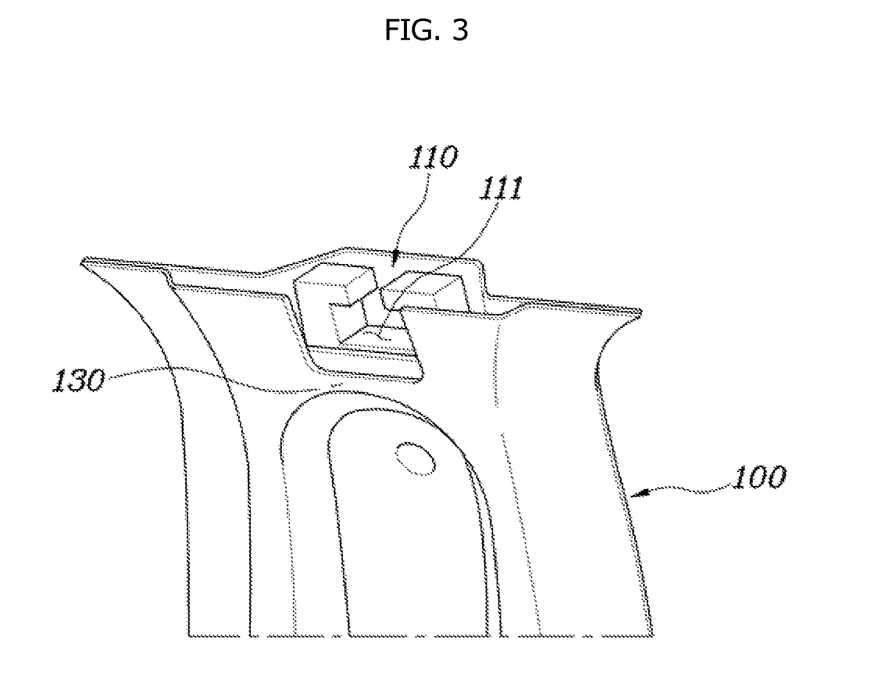
FIG. 3 is a view showing an upper end portion of a pillar member of a body of a vehicle according to an embodiment of the present invention.
Figure 4:
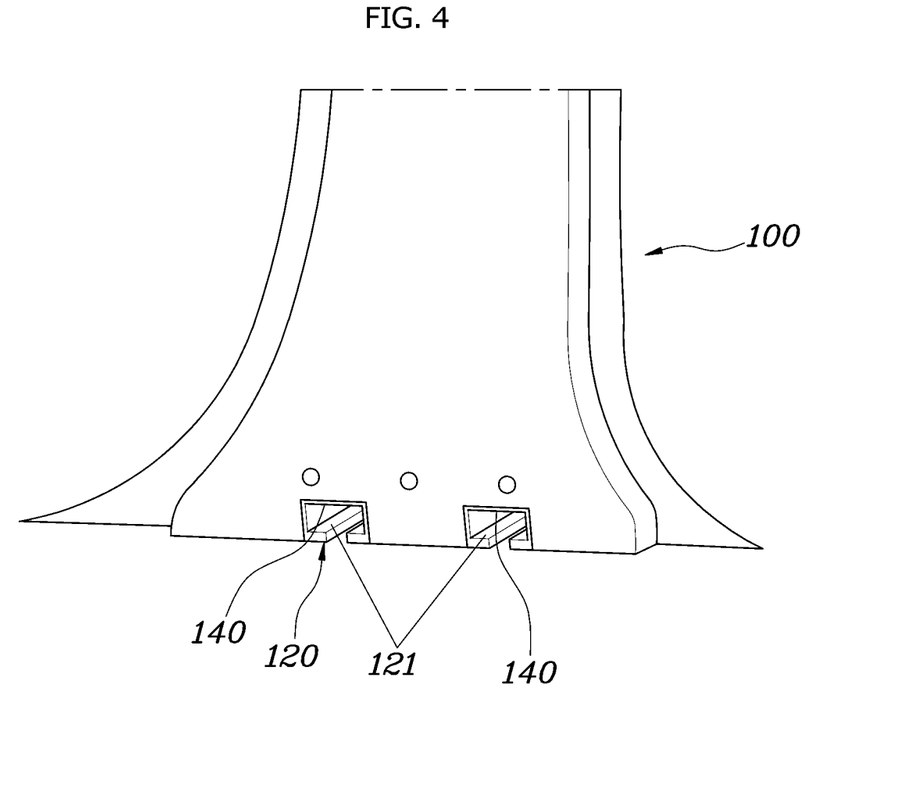
FIG. 4 is a view showing a lower end portion of a pillar member of a body of a vehicle according to an embodiment of the present invention.
Figure 5:
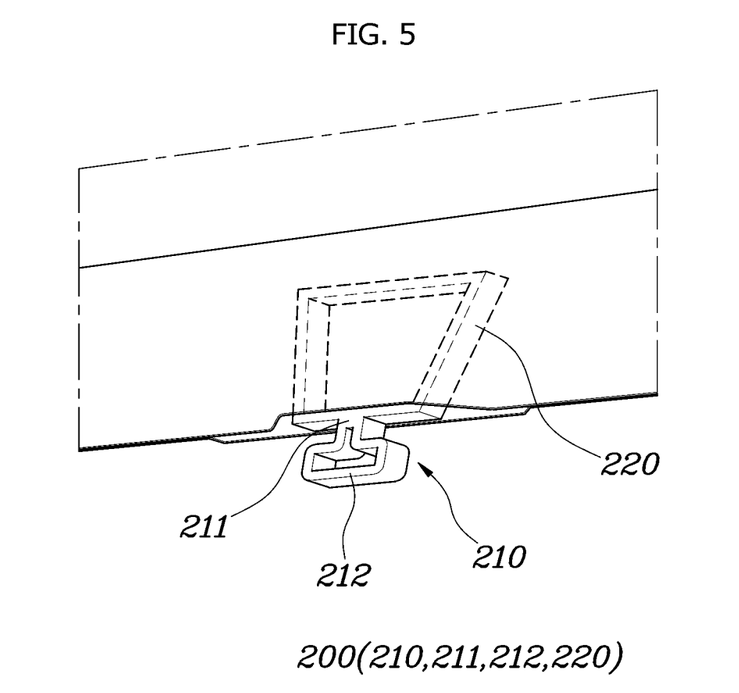
FIG. 5 is a view showing a roof side coupling portion of a body of a vehicle according to an embodiment of the present invention.
Figure 6:
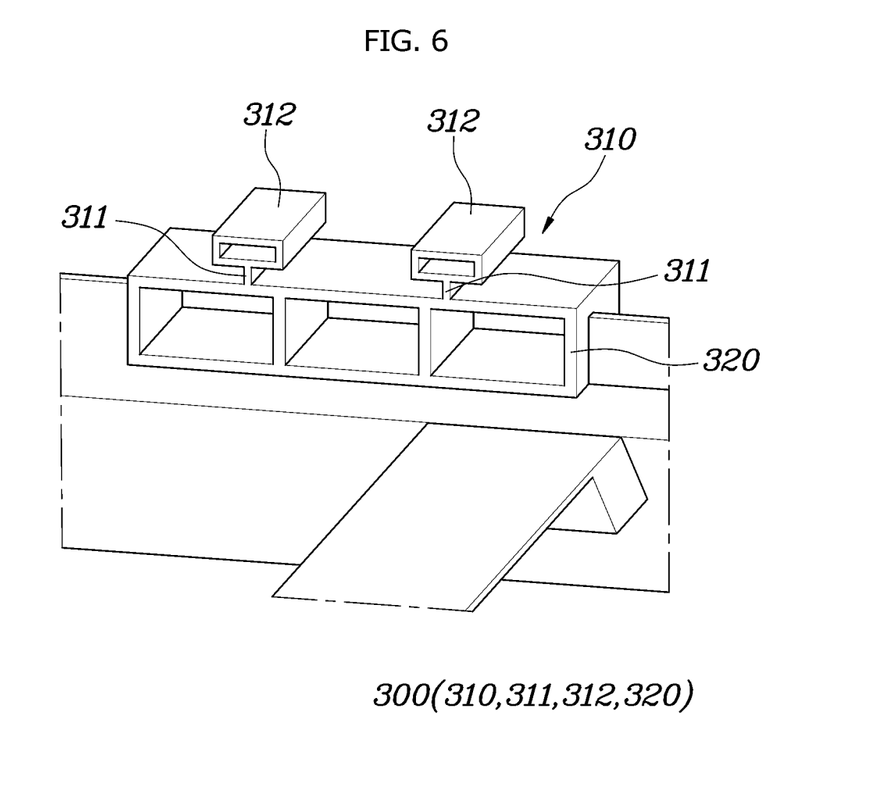
FIG. 6 is a view showing a side sill side coupling portion of a body of a vehicle according to an embodiment of the present invention.
Figure 7:
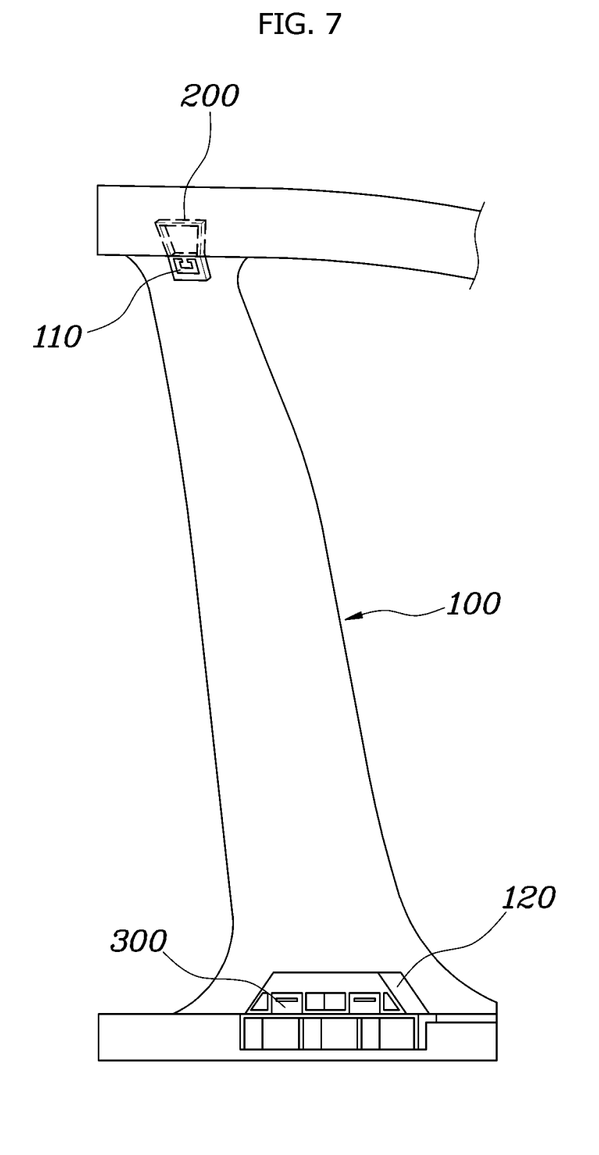
FIG. 7 is a view showing a state in which a pillar member is coupled to a body of a vehicle according to an embodiment of the present invention.

FIG. 1 is a view showing a body of a vehicle being coupled according to an embodiment of the present invention, FIG. 2 is a view showing a pillar member 100 of a body of a vehicle according to an embodiment of the present invention, FIG. 3 is a view showing an upper end portion of the pillar member 100 of the body of the vehicle according to an embodiment of the present invention, FIG. 4 is a view showing a lower end portion of the pillar member 100 of a body of a vehicle according to an embodiment of the present invention, FIG. 5 is a view showing a roof side coupling portion 200 of the body of the vehicle according to an embodiment of the present invention, FIG. 6 is a view showing a side sill side coupling portion 300 of the body of the vehicle according to an embodiment of the present invention, and FIG. 7 is a view showing a state in which the pillar member 100 is coupled to the body of the vehicle according to an embodiment of the present invention.

Preferred embodiments of a body of the vehicle according to the present invention will be described with reference to FIGS. 1 to 7.

The body of the vehicle according to embodiments of the present invention is manufactured such that a lower body of the vehicle is manufactured first, then an upper body into which an A-pillar and a roof portion are integrally manufactured is manufactured, and then, the lower body and the upper body are coupled to each other.

Embodiments of the present invention disclose technology for mounting a pillar member 100 to improve the rigidity of the middle side between the upper body and the lower body.

Specifically, the body of the vehicle according to embodiments of the present invention include the pillar member 100 provided with an upper fastening portion 110 at an upper end and a lower fastening portion 120 at a lower end, a roof side coupling portion 200 provided in a roof member extending in the longitudinal direction of the vehicle and coupled to the upper fastening portion 110 by insertion coupling when the pillar member 100 is coupled, and a side sill side coupling portion 300 provided in a side sill member extending in the longitudinal direction of the vehicle and coupled to the lower fastening portion 120 by insertion coupling when the pillar member 100 is coupled.

The roof side coupling portion 200 may be provided on the middle side of the roof of the vehicle body in which the lower body and the upper body are coupled to each other, and the side sill side coupling portion 300 may be provided on the middle side of the side sill of the lower body. Thereafter, in order for the pillar member 100 to be coupled to the vehicle body, the upper fastening portion no to be coupled to the roof side coupling portion 200 may be provided in the upper end portion of the pillar member 100 and the lower fastening portion 120 to be coupled to the side sill side coupling portion 300 may be provided in the lower end portion of the pillar member 100.

As shown in FIG. 1, the roof side coupling portion 200 and the upper fastening portion 110 may be coupled to each other by insertion coupling, and the side sill side coupling portion 300 and the lower fastening portion 120 may also be easily coupled to each other by insertion coupling.

This has the effect of improving convenience and productivity by enabling easy coupling of the pillar member 100 to the vehicle body in the vehicle body manufacturing line, and thus, having the effect of preventing an erroneous coupling of the pillar member in a wrong position or a wrong direction.

An adhesive material may be applied to the upper fastening portion 110 or the roof side coupling portion 200 for coupling, and an adhesive material may be applied to the lower fastening portion 120 or the side sill side coupling portion 300 for coupling.

In the drawings of embodiments of the present invention, a passenger car is shown as the vehicle and a B-pillar is shown as the pillar member 100, but the same may apply to all of the plurality of pillars connecting the side sill and the roof when the vehicle is provided with a plurality of pillars.

In addition, an adhesive material may be applied to either the upper fastening portion 110 or the roof side coupling portion 200 when the upper fastening portion no and the roof side coupling portion 200 are coupled to each other, and an adhesive material may be applied to either the lower fastening portion 120 or the side sill side coupling portion 300 when the lower fastening portion 120 and the side sill side coupling portion 300 are coupled to each other.

This has the effect of firmly fixing the upper fastening portion 110 and the roof side coupling portion 200 by the application of the adhesive material between the upper fastening portion 110 and the roof side coupling portion 200 when the upper fastening portion 110 and the roof side coupling portion 200 are coupled to each other and the effect of firmly fixing the lower fastening portion 120 and the side sill side coupling portion 300 by the application of the adhesive material between the lower fastening portion 120 and the side sill side coupling portion 300 when the lower fastening portion 120 and the side sill side coupling portion 300 are coupled to each other.

When the upper fastening portion 110, the roof side coupling portion 200, the lower fastening portion 120, and the side sill side coupling portion 300 are made of a metal material, an adhesive for bonding a metal material such as an epoxy adhesive may be used as the adhesive material. When the upper fastening portion 110, the roof side coupling portion 200, the lower fastening portion 120, and the side sill side coupling portion 300 are made of a synthetic resin material such as plastic, an adhesive for bonding a synthetic resin material such as an acrylic adhesive may be used as the adhesive material.

The pillar member 100 may be coupled to the vehicle body by the roof side coupling portion 200 and the side sill side coupling portion 300, and then, be fixed to the vehicle body by mechanical coupling.

When the upper fastening portion 110 and the roof side coupling portion 200 are coupled to each other by an adhesive material and the lower fastening portion 120 and the side sill side coupling portion 300 are coupled to each other by an adhesive material, mechanical coupling such as bolting or riveting may be further performed to reinforce the bonding force, thereby having the effect of strengthened coupling rigidity.

In addition, even in a state where the upper fastening portion 110 and the roof side coupling portion 200 are coupled to each other by insertion coupling and the lower fastening portion 120 and the side sill side coupling portion 300 are coupled to each other by insertion coupling so that the pillar member 100 is tentatively coupled to the vehicle body, further coupling may be performed by mechanical coupling such as bolting or riveting. This method has the effect of omitting the intermediate process of applying an adhesive material and improving productivity through directly coupling by mechanical coupling.

The roof side coupling portion 200 may include a first hook portion 210 protruding downward from a side surface of the roof and the upper fastening portion 110 may include a first insertion groove 111 formed in a shape corresponding to the shape of the first hook portion 210 so that the first hook portion 210 may be inserted.

As shown in FIGS. 3 and 5, the roof side coupling portion 200 may include the first hook portion 210 protruding downward from the roof and the upper fastening portion 110 may include the first insertion groove 111 into which the first hook is to be inserted.

This allows the operation of laterally coupling the pillar member 100 to a side of the vehicle body in the vehicle manufacturing line, thereby having the effect of improving productivity through easy coupling by an operator.

The first hook portion 210 may include a first protrusion portion 211 protruding downward from a side surface of the roof and a first extension portion 212 with a cross-sectional area expanded from the first protrusion portion 211, and the upper fastening portion 110 may be formed to surround the first extension portion 212 and the first protrusion portion 211.

As shown in FIGS. 3 and 5, the first hook portion 210 may include the first protrusion portion 211 protruding downward and the first extension portion 212 with the cross-sectional area expanded from the first protrusion portion 211 so as to be formed in a hammer shape, and the upper fastening portion 110 may include the first insertion groove 111 formed in a shape corresponding to the shape of the first hook portion 210.

This allows easy lateral coupling when the upper fastening portion 110 and the first hook portion 210 are coupled to each other and support for the pillar member 100 in the up/down direction due to the shape of the first hook portion 210 once the upper fastening portion 110 and the first hook portion 210 are coupled to each other, thereby having the effect of preventing a detachment in the up/down direction.

The upper fastening portion 110 may be coupled to the pillar member 100 by mechanical coupling such as bolting or riveting or welding coupling, and the roof side coupling portion 200 may be coupled to the roof side by mechanical coupling such as bolting or riveting or welding coupling.

The pillar member 100 may include a first indentation portion 130 formed by an indentation of an inner panel in a part of the pillar member 100 to which the upper fastening portion 110 is coupled.

As shown in FIG. 3, the first indentation portion 130 may be formed such that the inner panel of the part to which the upper fastening portion 110 is coupled is opened, and the upper fastening portion 110 and the roof side coupling portion 200 may be coupled to each other through the first indentation portion 130.

This allows the pillar member 100 to laterally move toward the inside of the vehicle so that the roof side coupling portion 200 may pass through the first indentation portion 130 and be coupled to the upper fastening portion 110 while the outer panel of the pillar member 100 is formed to be connected to the roof in a state where the upper fastening portion 110 and the roof side coupling portion 200 are coupled to each other, thereby having the effect of creating stylistic beauty.

Figure 8:
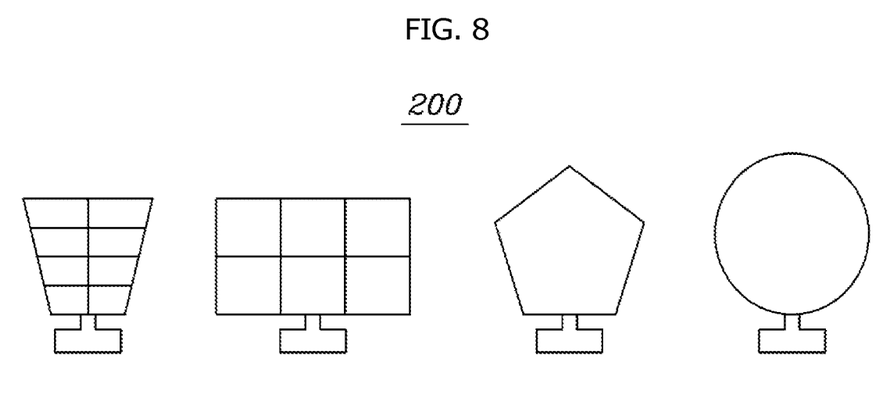
FIG. 8 is a view showing embodiments of a roof side coupling portion of a body of a vehicle according to an embodiment of the present invention.

FIG. 8 is a view showing embodiments of the roof side coupling portion 200 of the body of the vehicle according to an embodiment of the present invention.

The roof side coupling portion 200 may include a first coupling portion 220 extending toward the roof so as to be coupled to the roof, and the first coupling portion 220 may be manufactured in various shapes.

The roof side coupling portion 200 may include the first coupling portion 220 extending toward the roof side so as to be coupled to the roof such that the first coupling portion 220 may be coupled to the roof by welding coupling or mechanical coupling such as bolting or riveting.

The first coupling portion 220 may be manufactured in a hollow shape with an empty interior, and this has the effect of reducing weight.

As shown in FIG. 8, the first coupling portion 220 may be formed in various shapes according to the shape of the roof and may be made to suit the roof shape, and this facilitates coupling. When the first coupling portion 220 is manufactured in a hollow shape, it allows the addition of ribs inside to reinforce the rigidity.

In addition, the roof is molded through extrusion or press molding, the roof side coupling portion 200 is manufactured as a separate product and the first coupling portion 220 is coupled to the roof. This has the effect of maintaining the rigidity of the roof. Manufacturing the roof side coupling portion 200 as a separate product has the effect of reducing cost compared with integral manufacturing of the roof and the roof side coupling portion 200.

The side sill side coupling portion 300 may include a second hook portion 310 protruding upward from the side sill and the lower fastening portion 120 may include a second insertion groove 121 formed in a shape corresponding to the shape of the second hook portion 310 so that the second hook portion 310 may be inserted.

As shown in FIGS. 4 and 6, the second hook portion 310 protruding upward from the side sill may be formed in the side sill side coupling portion 300, and the lower fastening portion 120 may be provided with the second insertion groove 121 into which the second hook is to be inserted.

This allows the operation of laterally coupling the pillar member 100 to the side of the vehicle body in the vehicle manufacturing line, thereby having the effect of improving productivity through easy coupling by an operator.

The second hook portion 310 may include a second protrusion portion 311 protruding upward from the upper surface of the side sill and a second extension portion 312 with a cross-sectional area expanded from the second protrusion portion 311, and the lower fastening portion 120 may be formed to surround the second extension portion 312 and the second protrusion portion 311.

As shown in FIGS. 4 and 6, the second hook portion 310 may include the second protrusion portions 311 protruding upward and the second extension portion 312 with a cross-sectional area expanded from the end of the second protrusion portion 311 to be formed in a hammer shape, and the lower fastening portion 120 may include the second insertion groove 121 formed in a shape corresponding to the shape of the second hook portion 310.

This allows easy lateral coupling when the lower fastening portion 120 and the second hook portion 310 are coupled to each other and the pillar member 100 is supported in the up/down direction due to the shape of the second hook portion 310 once the lower fastening portion 120 and the second hook portion 310 are coupled to each other, thereby having the effect of preventing a detachment in the up/down direction.

The lower fastening portion 120 may be coupled to the pillar member 100 by mechanical coupling such as bolting or riveting or welding coupling, and the side sill side coupling portion 300 may be coupled to the side sill by mechanical coupling such as bolting or riveting or welding coupling.

Figure 9:
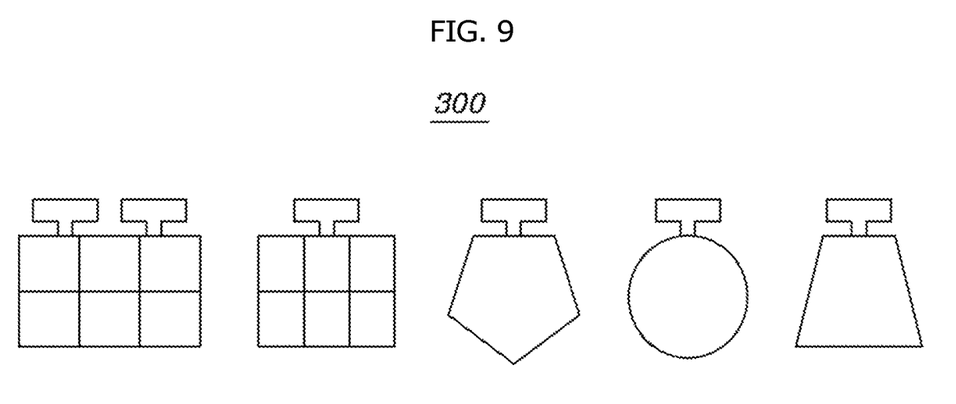
FIG. 9 is a view showing embodiments of a side sill side coupling portion of a body of a vehicle according to an embodiment of the present invention.

FIG. 9 is a view showing embodiments of the side sill side coupling portion 300 of the body of the vehicle according to an embodiment of the present invention.

A plurality of the second protrusion portions 311 and the second extension portions 312 may be disposed to be spaced apart from each other in the extending direction of the side sill, and a plurality of the lower fastening portions 120 may be provided to match the second protrusion portions 311 and the second extension portions 312.

As shown in FIGS. 7 and 9, the lower end portion of the pillar member 100 is wider than the upper end portion so that a greater number of second protrusion portions 311 are required than the first protrusion portions 211.

To prepare for this, a plurality of second protrusion portions 311 may be disposed to be spaced apart from each other in the extending direction of the side sill, and a plurality of lower fastening portions 120 may be provided or a plurality of second insertion grooves 121 may be formed to match the number of second protrusion portions 311.

This has the effect of firmly fixing to the side sill, and supporting, the pillar member 100 having the lower end wider than the upper end.

The side sill side coupling portion 300 may include the second coupling portion 320 extending in the extending direction of the side sill so as to be coupled to the side sill.

The side sill side coupling portion 300 may include the second coupling portion 320 extending toward the side sill so as to be coupled to the side sill, and the second coupling portion 320 may be coupled to the side sill by welding coupling or mechanical coupling such as bolting or riveting.

The second coupling portion 320 may be manufactured in a hollow shape with an empty interior, and this has the effect of reducing weight.

As shown in FIG. 9, the second coupling portion 320 may be formed in various shapes according to the shape of the side sill and may be made to suit the shape of the side sill. This facilitates coupling. When the second coupling portion 320 is manufactured in a hollow shape, it allows the addition of ribs inside to reinforce the rigidity.

In addition, the side sill is molded through extrusion or press molding, the side sill side coupling portion 300 is manufactured as a separate product, and the second coupling portion 320 is coupled to the side sill. This has the effect of maintaining the rigidity of the side sill. Manufacturing the side sill side coupling portion 300 as a separate product has the effect of reducing cost compared with integral manufacturing of the side sill and the side sill side coupling portion 300.

The pillar member 100 may include a second indentation portion 140 formed by an indentation of the inner panel in a part of the pillar member 100 to which the lower fastening portion 120 is coupled.

As shown in FIG. 4, the second indentation portion 140 may be formed such that the inner panel of the part to which the lower fastening portion 120 is coupled is opened, and the lower fastening portion 120 and the side sill side coupling portion 300 may be coupled to each other through the second indentation portion 140.

This allows the pillar member 100 to laterally move toward the inside of the vehicle so that the side sill side coupling portion 300 may pass through the second indentation portion 140 and be coupled to the lower fastening portion 120 while the outer panel of the pillar member 100 is formed to be connected to the side sill in a state where the lower fastening portion 120 and the side sill side coupling portion 300 are coupled to each other, thereby having the effect of creating stylistic beauty.

Specific embodiments of the present invention are illustrated and described, but it will be self-evident to those skilled in the art that the present invention may be improved upon and modified in various ways within the scope not departing from the technical spirit of the present invention provided by the patent claims below.

What is claimed is:

1. A vehicle body comprising:
   a pillar member including an upper fastening portion at an upper end and a lower fastening portion at a lower end;
   a roof side coupling portion provided in a roof member extending in a longitudinal direction of the vehicle body, wherein the roof side coupling portion is configured to be coupled to the upper fastening portion by insertion coupling; and
   a side sill side coupling portion provided in a side sill member extending in the longitudinal direction of the vehicle body, wherein the side sill side coupling portion is configured to be coupled to the lower fastening portion by insertion coupling,
   wherein the pillar member includes any one or more of a first indentation portion defined by an indentation of an inner panel in a part of the pillar member to which the upper fastening portion is coupled, or a second indentation portion defined by an indentation of an inner panel in a part of the pillar member to which the lower fastening portion is coupled.

2. The vehicle body according to claim 1, wherein:
   the roof side coupling portion includes a first hook portion protruding downward from a side surface of a roof; and
   the upper fastening portion includes a first insertion groove formed in a shape corresponding to a shape of the first hook portion, wherein the first insertion groove is configured to receive the first hook portion.

3. The vehicle body according to claim 2, wherein:
   the first hook portion includes a first protrusion portion protruding downward from the side surface of the roof and a first extension portion with a cross-sectional area expanded from the first protrusion portion; and
   the upper fastening portion is configured to surround the first extension portion and the first protrusion portion.

4. The vehicle body according to claim 1, wherein:
   the roof side coupling portion includes a first coupling portion extending toward and configured to be coupled to a roof; and
   the first coupling portion comprises one of various shapes.

5. The vehicle body according to claim 1, wherein the side sill side coupling portion includes a second coupling portion extending in an extending direction of the side sill member and coupled to the side sill member.

6. The vehicle body according to claim 1, further comprising:
   a first adhesive material on the upper fastening portion or the roof side coupling portion; and
   a second adhesive material on the lower fastening portion or the side sill side coupling portion.

7. The vehicle body according to claim 1, wherein:
   the pillar member is coupled to the vehicle body by the roof side coupling portion and the side sill side coupling portion; and
   the pillar member coupled to the roof side coupling portion and the side sill side coupling portion is mechanically coupled to the vehicle body.

8. A vehicle body comprising:
   a pillar member including an upper fastening portion at an upper end and a lower fastening portion at a lower end, wherein the lower fastening portion includes an insertion groove having a first shape;
   a roof side coupling portion provided in a roof member extending in a longitudinal direction of the vehicle body, wherein the roof side coupling portion is configured to be coupled to the upper fastening portion by insertion coupling; and
   a side sill side coupling portion provided in a side sill member extending in the longitudinal direction of the vehicle body, wherein the side sill side coupling portion is configured to be coupled to the lower fastening portion by insertion coupling, and wherein the side sill side coupling portion includes a hook portion protruding upward from the side sill member, the hook portion having a second shape corresponding to the first shape and configured to be inserted into the insertion groove,
   wherein the pillar member includes any one or more of a first indentation portion defined by an indentation of an inner panel in a part of the pillar member to which the upper fastening portion is coupled, or a second indentation portion defined by an indentation of an inner panel in a part of the pillar member to which the lower fastening portion is coupled.

9. The vehicle body according to claim 8, wherein:
   the hook portion includes a protrusion portion protruding upward from an upper surface of the side sill member and an extension portion with a cross-sectional area expanded from the protrusion portion; and
   the lower fastening portion is configured to surround the extension portion and the protrusion portion.

10. The vehicle body according to claim 9, wherein:
a plurality of the protrusion portions and the extension portions are spaced apart from each other in an extending direction of the side sill member; and
a plurality of the lower fastening portions are provided to match the protrusion portions and the extension portions.

11. A method of assembly a vehicle body, the method comprising:
providing a pillar member including an upper fastening portion at an upper end and a lower fastening portion at a lower end;
insertion coupling a roof side coupling portion to the upper fastening portion, wherein the roof side coupling portion is provided in a roof member extending in a longitudinal direction of the vehicle body; and
insertion coupling a side sill side coupling portion to a lower coupling portion, wherein the side sill side coupling portion is provided in a side sill member extending in the longitudinal direction of the vehicle body,
wherein the pillar member includes any one or more of a first indentation portion defined by an indentation of an inner panel in a part of the pillar member to which the upper fastening portion is coupled, or a second indentation portion defined by an indentation of an inner panel in a part of the pillar member to which the lower fastening portion is coupled.

12. The method according to claim 11, wherein:
the roof side coupling portion includes a first hook portion protruding downward from a side surface of a roof;
the upper fastening portion includes a first insertion groove formed in a shape corresponding to a shape of the first hook portion; and
the first insertion groove receives the first hook portion.

13. The method according to claim 12, wherein:
the first hook portion includes a first protrusion portion protruding downward from the side surface of the roof and a first extension portion with a cross-sectional area expanded from the first protrusion portion; and
the upper fastening portion surrounds the first extension portion and the first protrusion portion.

14. The method according to claim 11, wherein:
the roof side coupling portion includes a first coupling portion extending toward and coupled to a roof; and
the first coupling portion comprises one of various shapes.

15. The method according to claim 11, wherein the side sill side coupling portion includes a second coupling portion extending in an extending direction of the side sill member and coupled to the side sill member.

16. The method according to claim 11, further comprising:
applying a first adhesive material on the upper fastening portion or the roof side coupling portion; and
applying a second adhesive material on the lower fastening portion or the side sill side coupling portion.

17. The method according to claim 11, further comprising:
coupling the pillar member to the vehicle body by the roof side coupling portion and the side sill side coupling portion; and
after coupling the pillar member to the vehicle body by the roof side coupling portion and the side sill side coupling portion, mechanically coupling the pillar member to the vehicle body.

18. The vehicle body according to claim 8, further comprising:
a first adhesive material on the upper fastening portion or the roof side coupling portion; and
a second adhesive material on the lower fastening portion or the side sill side coupling portion.

19. The vehicle body according to claim 8, wherein the pillar member is coupled to the vehicle body by the roof side coupling portion and the side sill side coupling portion.

20. The vehicle body according to claim 19, wherein the pillar member coupled to the roof side coupling portion and the side sill side coupling portion is mechanically coupled to the vehicle body.

* * * * *